Figure 13:
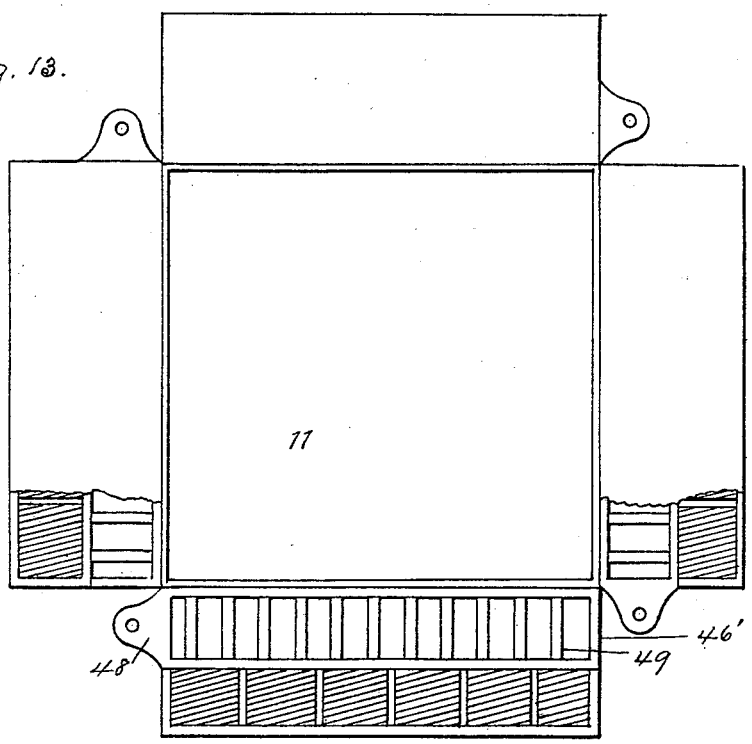

No. 616,491. Patented Dec. 27, 1898.
T. REES.
PROCESS OF AND APPARATUS FOR COATING METALLIC SHEETS.
(Application filed Oct. 18, 1897.)
(No Model.) 5 Sheets—Sheet 1.
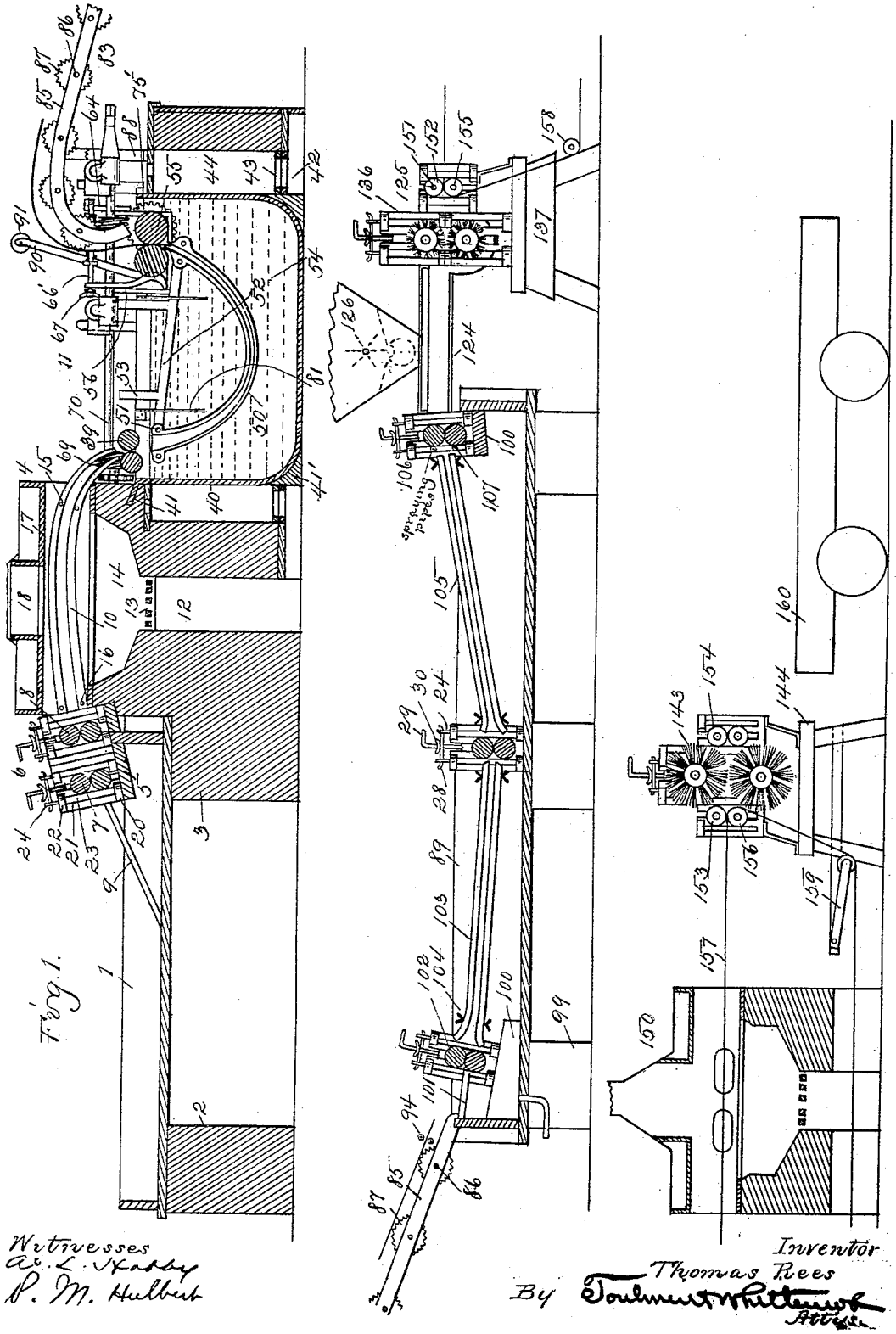
Witnesses
Inventor
Thomas Rees
By No. 616,491. Patented Dec. 27, 1898.
T. REES.
PROCESS OF AND APPARATUS FOR COATING METALLIC SHEETS.
(Application filed Oct. 18, 1897.)
(No Model.) 5 Sheets—Sheet 2.
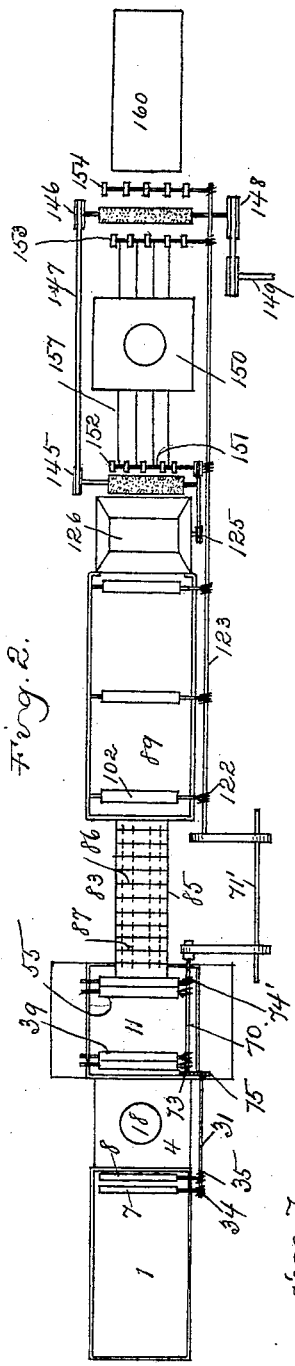
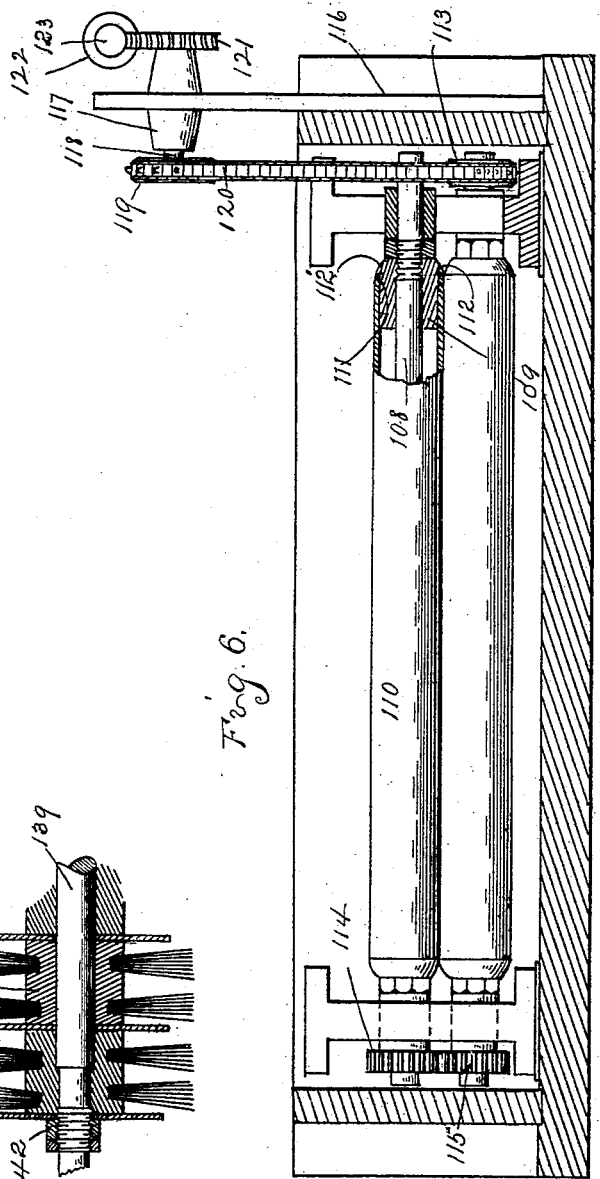
Witnesses
A. L. Hobby
P. M. Hulbert
Inventor
Thomas Rees
By Toulmin & Toulmin
Attys.

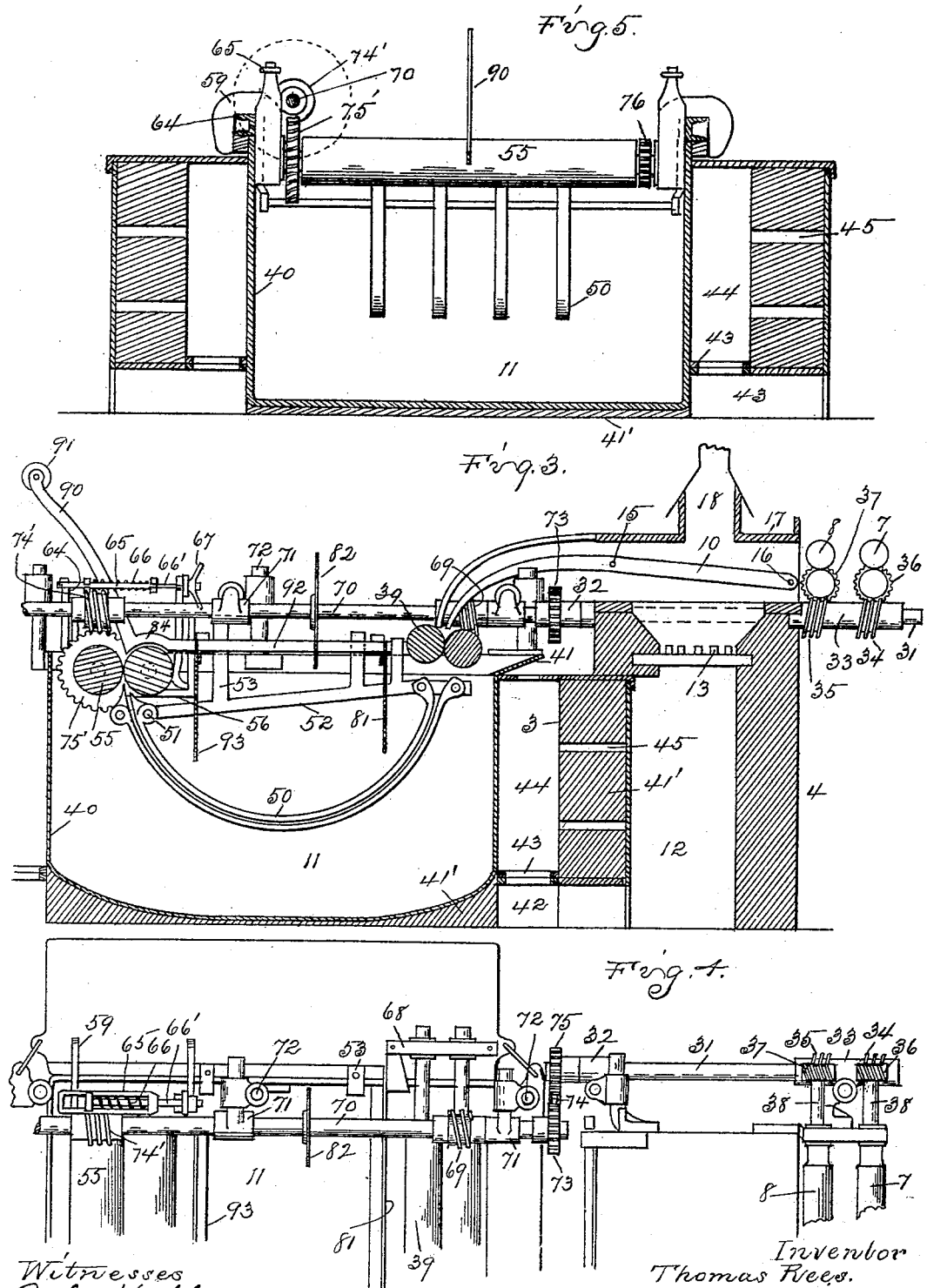

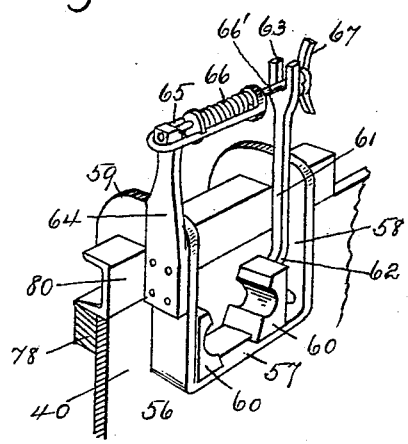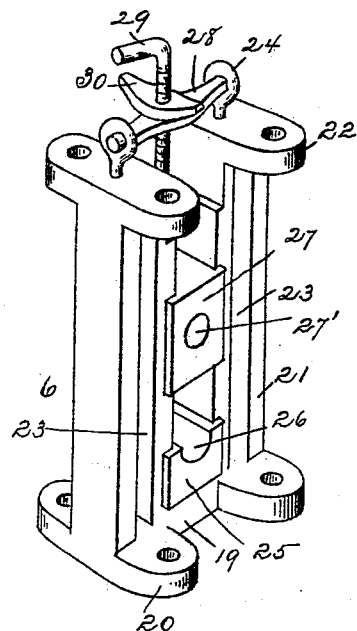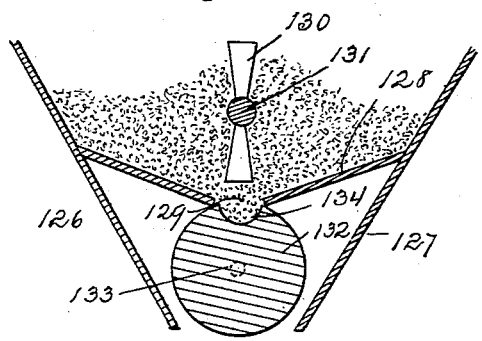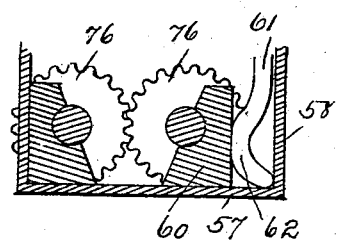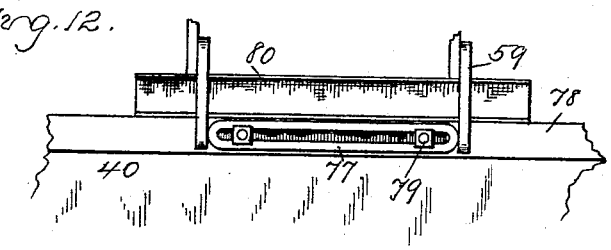

No. 616,491. Patented Dec. 27, 1898.
T. REES.
PROCESS OF AND APPARATUS FOR COATING METALLIC SHEETS.
(Application filed Oct. 18, 1897.)
(No Model.) 5 Sheets—Sheet 5.

Inventor
Thomas Rees
By Toulmin & Whittemore
Attys.

Witnesses
A. L. Kathy
N. M. Hulbert

UNITED STATES PATENT OFFICE.

THOMAS REES, OF CLEVELAND, OHIO.

PROCESS OF AND APPARATUS FOR COATING METALLIC SHEETS.

SPECIFICATION forming part of Letters Patent No. 616,491, dated December 27, 1898.

Application filed October 18, 1897. Serial No. 655,513. (No model.)

*To all whom it may concern:*

Be it known that I, THOMAS REES, a subject of the Queen of Great Britain, residing at Cleveland, in the county of Cuyahoga and State of Ohio, have invented certain new and useful Improvements in Processes of and Apparatus for Coating Metallic Sheets, of which the following is a specification, reference being had therein to the accompanying drawings.

The invention has reference to an improved process of galvanizing metallic sheets or plates and to the novel construction of the apparatus for carrying out the several steps of the process.

One object of my invention is to produce galvanized metallic sheets that will be free, when finished, from spots and stains caused by particles of flux and other foreign matter adhering to the plates while undergoing treatment.

A further object of my invention is to provide means for carrying out the steps of the process in a more rapid and effective manner than heretofore, to so construct the apparatus that the amount of coating to be deposited upon the sheets may be regulated at will, and to further form the mechanism so that after the sheets pass through the apparatus they may be taken therefrom in a finished condition ready to be immediately stored or shipped, as desired.

To attain the object first mentioned, I subject the plates to a process which consists, essentially, in immersing said plates after their removal from the pickling-vats in a flux-bath, whereby the foreign matter that may have been deposited upon the same will be removed and the desired surface provided which is to receive the coating, in then submerging the sheets in a bath of coating material, and finally in subjecting the coated sheets while hot to the action of a bath of material that will remove any matter upon the plates that will be liable to stain or spot the same.

My invention consists, therefore, in a process substantially as set forth and in the peculiar construction of an apparatus for carrying out the various steps of the process, as will be more fully hereinafter shown, and described in the accompanying drawings, in which—

Figure 14:
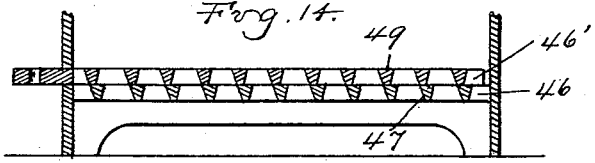
Figure 15:
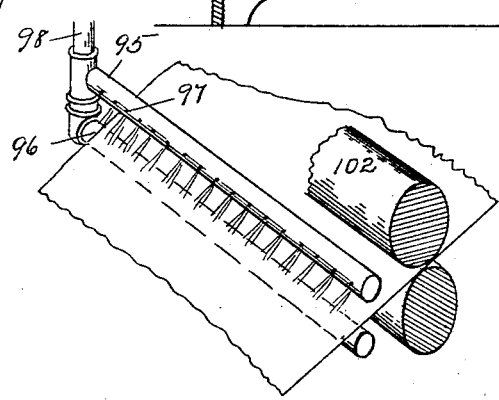

Figure 1 is a diagram elevation of my improved apparatus, showing the same as arranged when in use. Fig. 2 is a diagram plan view of the same. Fig. 3 is a vertical central section through the drier and coating-tank, illustrating the peculiar construction and arrangement of parts. Fig. 4 is a partial plan view of the apparatus shown in Fig. 3. Fig. 5 is an end elevation, partly in section, of the mechanism shown in Figs. 3 and 4. Fig. 6 is a detailed view of a pair of rolls arranged in the washing-tank, with mechanism for operating the same, one of said rolls being partially broken away to illustrate its construction. Fig. 7 is a detached sectional view of one of the brushes, illustrating its formation. Fig. 8 is a perspective view of a housing for the rolls. Fig. 9 is a similar view of a portion of the coating-tank with the roll-supports secured thereto. Fig. 10 is an enlarged detailed sectional view of a portion of the roll-support, showing the bearings arranged therein and the means for adjusting the latter. Fig. 11 is a detached sectional view of the hopper. Fig. 12 is a side elevation of a portion of the coating-tank, illustrating the adjusting mechanism for the roll-support. Fig. 13 is a plan view of the coating-tank, the top being partially broken away, showing the construction of fire-grates and their location. Fig. 14 is a detached sectional view of the fire-grates, and Fig. 15 is a perspective view of the spraying device.

In the apparatus about to be described the numeral 1 represents a pickling-tank of any preferable construction, mounted upon a standard 2 and a portion of the brickwork 3, which forms the outer casing of the drier 4. Upon a platform 5, arranged within the pickling-tank, are mounted two housings 6, which carry two pairs of feed-rolls 7 and 8, and 9 is a conveyer-plate leading from the tank to the first pair of rolls. The rolls just mentioned feed the plates into the drier 4 through guides 10, where the plates are dried before entering the coating-tank 11. In construction the drier is provided with the usual ash-box 12, fire-grate 13, and combustion-chamber 14. The curved guide-rods are arranged in pairs and mounted in the drier upon supporting-rods 15 and 16, which extend transversely through the drier and are fixedly secured within its walls. 17 is a metallic top for said drier, and 18 is an opening or chimney through which the products of combustion pass.

The housing 6 just referred to is employed in nearly all cases as a support for the rolls and in construction comprises a base 19, Fig. 8, provided with perforated ears 20. Uprights 21 are arranged upon the base, preferably integral therewith, and are provided in a like manner with perforated ears 22. The uprights are slotted at 23 to make the housing as light as possible and upon their tops are provided with eyebolts 24. Between the uprights and arranged upon the base is a bearing-block 25, recessed at 26, which is adapted to receive the journal of the lower roll.

27 is a block somewhat similar to 25 in construction, which is adapted to slide vertically between the uprights and is provided with a circular recess 27', in which the journal of the top roll bears. To hold the rolls in their proper relation with respect to each other, means are employed for forcing the bearing-block 27 downward, consisting, essentially, in an apertured cross-bar 28, which engages the eyebolts 24, a threaded screw or bolt 29, and a locking bar or nut 30. If desired, packing may be interposed between the free end of the screw 29 and the block 27.

The feed-rolls 7 and 8 are of ordinary construction and are mounted one above the other in the housings 6 just described, the journals of said feed-rolls having bearings in the bearing-blocks 26 and 27. A shaft 31, mounted in bearings 32 and 33, secured to the side of the drier, forms the drive mechanism for the rolls just mentioned, the shaft driving said rolls by means of worms 34 and 35, engaging worm-wheels 36 and 37, carried upon the extensions 38 of the lower roll-spindles.

The curved guides 10 before referred to extend beyond the drier, and their free ends are arranged so that the plates in passing therethrough will enter directly between a pair of flux-rolls 39, which are arranged in a novel manner within the coating-tank 11. As the latter device embodies a number of important features and comprises an essential part of my invention, it will now be particularly described.

The tank or vat proper, 40, is provided with a lip 41, Fig. 3, which is preferably embedded within the brickwork 3 of the drier, and the tank is further provided with brickwork 41', which extends beneath and around the sides of the latter. In the side walls are formed the furnaces for heating the coating material comprising ash-pits 42, fire-grates 43, and heating-chamber 44, each furnace being provided with draft-passages 45, through which the products of combustion pass. The furnace that is adjacent to the drier is formed within the brickwork of the latter, as shown in Fig. 1.

To permit of shaking the fires and at the same time affording means for regulating the draft for the latter, an improved fire-grate is employed, comprising a grate 46, Fig. 14, preferably rectangular in form and provided with transverse grate-bars 47, spaced, as in ordinary construction, at some distance apart. Two of these grates are used, one being fixedly secured within the brickwork, such as 46, and a second grate 46' of similar construction being arranged directly on top of the former and being capable of lateral movement to and fro. The top grate is provided with an apertured extension 48, by means of which the fires may be shaken when desired, and by drawing the grate outward a slight distance the spaces between the grate-bars 47 will be covered to a greater or less extent by corresponding bars 49 in the top grate 46', whereby the draft is regulated.

Within the tank are arranged a number of guide-rods, such as 50, for the metallic sheets, said rods being arranged in pairs and suspended within the tank upon transverse rods, such as 51, which are fixedly secured to a supporting-bar 52 upon each side of the tank. These bars carrying the guides are attached to hooks 53, which are hung upon the sides of the tank and are adapted to be adjusted laterally thereon to permit the guides to be moved, so that the latter may be brought directly to the nip of the rolls.

The guides just described are adapted to be completely immersed within the molten zinc 54, which forms the coating-bath, one end of each pair of guides being arranged directly under the flux-rolls and the other end being located directly beneath a pair of coating-rolls 55. These latter rolls are suspended within the tank in bearings which depend from the sides thereof, the roll-supports being of the following construction.

The numeral 56 represents a U-shaped support comprising a horizontal base member 57, terminating at each end in upwardly-projecting arms 58. These arms in turn terminate in hooks 59, which extend over the sides of the tank. Within this support and preferably slidingly engaging the base member thereof are the half bearing-blocks 60. At the rear of one of the blocks is an upright 61, the lower end of which is provided with an inwardly-extending curved portion 62, which bears against the block, while the upper end projects at some distance above the hook to which it is adjacent and terminates in a bifurcated end 63. An upright 64 is fixedly secured to one side of the support, and the two uprights are connected by an adjusting mechanism comprising a shackle 65, spring 66, and threaded rod 66'. The free end of the latter extends through the bifurcated end 63, and through the agency of a winged nut 67, carried on the rod, the tension of the rolls is adjusted.

The flux-rolls 39, which are located directly beneath the curved ends of the guide-rods 10, are arranged across the tank in suitable bearings, such as 68. Upon the spindle of one of the rolls is arranged a worm-wheel (not shown) which is adapted to engage with the worm 69 upon the shaft 70, journaled in bearings 71, which are supported by uprights 72, bolted to the side of the tank. This shaft at one end carries a sprocket-wheel 73, which is connected by means of a sprocket-chain 74 to a similar sprocket-wheel 75 upon the shaft 31, and the two shafts just referred to are preferably operated through a line-shaft 71', as shown in Fig. 2.

Upon the free end of the shaft 70 is arranged a worm-gear 74', which meshes with a worm-wheel 75' upon the spindle of one of the coating-rolls. Upon the ends of these rolls opposite the worm-wheel 75' are gear-wheels 76, as plainly shown in Fig. 10, which engage with each other to give a positive movement to the rolls.

In order to form the proper adjustments between the rolls and the guide-rods within the coating-tank, I have provided means for moving said rolls laterally, which adjusting mechanism comprises a slotted rectangular bar 77, arranged between the hooks 59, as shown in Fig. 12, and secured to a bar 78, formed upon the outside of the coating-tank by adjusting-bolts 79.

It is found desirable at times to vary the amount of coating that is to be deposited upon the plates, and to accomplish this I so arrange the coating-rolls as to permit of their being immersed within the coating material, as shown in Figs. 1 and 3, wherein the rolls are in close proximity to the ends of the plate-guides or to be raised entirely or partially without the coating material. To accomplish this latter step, I introduce a bar 80, preferably in the form of a channel-iron, and arrange this bar beneath the hooks of the roll-support 56, as shown in Fig. 9. When in this latter position, the rolls will receive the plates after the latter have passed from the coating-bath, and a thinner layer of the coating material in consequence will be deposited thereon. To permit this adjustment to be made, the shaft 70 is raised a sufficient amount by properly adjusting the bearings 71 upon their supports 72.

Another feature of my improved coating apparatus is the peculiar location of the flux-rolls. These I have arranged in such manner that their surfaces will dip within the flux which is placed within the coating-tank and is kept in the proper portion thereof by means of a partition 81. By this peculiar location of the rolls the flux adheres to the same when they are in operation, and a considerable quantity is brought between the rolls above the nip, so that the metallic sheet before entering the rolls and molten zinc will pass through a bath of flux, whereby the foreign material upon the plates will be removed and a superior surface formed which is to receive the zinc or other deposit. The coating-vat is further provided with an indicator adapted to show the amount of molten zinc within the vat and with means for flipping the ends of the galvanized sheets to remove from the same the coating which collects upon the bottom edges when the latter is passing out of the vat. The first device consists of a metallic disk 82, which is fixedly secured to the drive-shaft 70 in such manner that the periphery of the disk will just clear the molten metal when the latter is at the proper height within the vat. The mechanism for removing the superfluous coating upon the sheets comprises a conveyer 83 of peculiar form and construction and a guide-bar 84. The conveyer referred to comprises two side bars 85, connected by a plurality of transverse rods 86, upon which are loosely sleeved a number of toothed disks 87, as plainly shown in Fig. 2. At one end the conveyer is secured to the coating-vat by means of supporting-standards 88, and the free end of the conveyer rests upon the end of the washing-tank 89. The end of the conveyer that is secured to the coating-vat extends over and partly into the same, the side bars 85 being curved at their free ends, as shown in Fig. 1, and being so arranged in relation to the coating-rolls that the outer curved portions of the bars will be preferably in vertical alinement with the nip of the rolls. The series of toothed disks arranged upon the transverse rod, which has bearings in the curved portions of the side bars, will project to the rear of the rolls, so that a sheet when passing through the latter will be bent rearwardly to said coating-rolls instead of being delivered vertically therefrom. The guide-bar 84 comprises an upright portion 90, carrying at its free end a roller 91 and a horizontal portion 92, Fig. 3, which is fixedly secured in the partition 81 and a similar partition 93. When the end of the sheet leaves the coating-rolls, it will be flipped against the guide-rod 84 on account of the peculiar arrangement of the several parts, and the coating material which has accumulated on the lower edge of the sheet will be shaken off and returned to the vat. The metallic sheets after passing through the coating-vat are carried over the conveyer by the operator, from whence they pass into the washing-tank 89. Before entering this tank the temperature of the sheets is preferably lowered by subjecting the latter to the action of steam, which is sprayed upon the plates from the spray-pipes 94, arranged at the end of the conveyer. In construction this spraying apparatus and the spraying mechanism hereinafter referred to comprise, essentially, two transversely-disposed pipes 95 and 96, arranged above and below the plate and provided with a series of perforations 97, through which the steam passes, the perforations being inclined, so that the steam-jets will be directed against the sheets. Steam is supplied to the pipes just referred to through a supply-pipe 98.

The washing-tank 89 is of any ordinary construction and is mounted on suitable standards 99. At each end the tank is provided with a platform 100, upon which a housing similar in construction to the one before referred to is bolted, and at the center of the tank a third housing is fixedly secured to the tank-bottom. The conveyer-grating 101 joins the end of the conveyer to the housing, so that the plates after leaving the conveyer will pass directly between a pair of feed-rolls 102, arranged within said housing. Suitable guide-bars 103 are arranged between the center housing and the feed-rolls and are provided with transverse supports 104, secured to the sides of the tank. A second series of guides 105 are arranged between the central housing and a pair of delivery-rolls 106 and are of like construction and arranged and supported in a similar manner to the guides 103. A cold-water-spraying apparatus 107 is located in front of the delivery-rolls, which is similar in formation to the one just referred to, the function of which is to wash the plates and at the same time act as a water-supply for the tank. In construction the rolls within the tank each consist of a spindle 108, having threaded upon its ends brass bushings 109, while arranged over the bushings is a tube 110. The edges of the tube are beveled, as at 111, so as to engage with an undercut 112, formed within a shoulder 112' on the bushing. The ends of the spindle of each lower roll project beyond the housings and carry upon the ends thereof a sprocket-wheel 113 and a gear-wheel 114. A similar gear-wheel 115 is arranged upon the spindle of each upper roll, so that a positive engagement will be had between each pair of rolls. By forming the rolls in the manner described superfluous metal is dispensed with and a light and durable roll is obtained. An upright 116 is bolted to the tank, upon one side thereof, and carries in a bearing 117 a stub-shaft 118. Upon the inner end of the shaft a sprocket 119 is arranged, which is connected to the sprocket 113 by a sprocket-chain 120. The outer end of the shaft carries a worm-wheel 121. A driving mechanism similar to the one described is provided for each pair of rolls, and the worm-wheels 121 are operated by means of worms 122 upon a drive-shaft 123, which receives motion from the line-shaft 71'. The sheets after passing through the delivery-rolls in the washing-tank pass over a platform 124 on their way to the scrubbing mechanism 125, while arranged above the platform is a hopper 126, containing absorbent material, such as sawdust, which is adapted to be deposited upon the plates as they pass thereunder. In construction the hopper comprises a casing 127, Fig. 11, provided on its interior with the guides 128, which approach in proximity to each other, forming a feed-spout 129. In the body of the hopper above the feed-spout are arranged stirrer-blades 130 upon a shaft 131, and below the spout is located a cylinder or drum 132, revolubly mounted upon a shaft 133. The cylinder is arranged in close proximity to the feed-spout, so that the former will form a cut-off for the latter, and the cylinder is provided with a deep longitudinal groove 134, adapted to receive a supply of sawdust, which upon the revolution of the cylinder will be deposited upon the plates. The shaft 131 which carries the stirrer-blades, extends outside the casing and carries thereon a pulley 135, which is belted to a corresponding pulley upon the shaft 133. Motion is transmitted to these shafts indirectly from the side shaft 123.

The scrubbing devices, which thoroughly cleanse the plates from foreign material which may have become deposited thereon, consist, essentially, of a pair of scrubbing-brushes which are arranged in a housing 136 in a manner similar to the rolls, the housing, in turn, being supported upon a platform 137. Each brush comprises a series of segments, such as 138, Fig. 7, mounted upon a spindle 139, the segments being provided with the bristles 140. Between the adjacent segments disks (preferably metallic) 141 are interposed and extend in proximity to the ends of the bristles. The segments are clamped to each other by means of nuts 142, threaded upon the ends of the spindle. The function of the disks is to prevent the bristles of the brush from being crushed by the plates while passing over the same. A second pair of brushes 143, mounted in a manner similar to the scrubbing-brushes and supported upon a platform 144, are employed for the purpose of polishing the plates, which is the last step of the process and the last piece of mechanism in my improved apparatus. As the scrubbing and polishing brushes are required to revolve at a high speed in order to perform their function properly, the spindles of the upper and lower brushes in each pair are extended and carry sprockets thereon, such as 145 and 146, Fig. 2, which are connected by a chain 147. The spindle of one polishing-brush carries a pulley 148, which is belted to a line-shaft 149, from which both pairs of brushes receive motion. Interposed between the two pairs of brushes just described is a drier 150, similar in construction to the drier before mentioned, through the heating-chamber of which the plates pass after being scrubbed.

The mechanism for carrying the plates through the drier from one pair of brushes to the other is of the following construction: A housing of usual form is mounted upon the platform 137 adjacent to the scrubbing-brushes and carries in the usual manner a pair of shafts 151, upon which are arranged two series of draw-disks 152. Similar series of disks 153 and 154 are mounted in a similar manner respectively in front and at the rear of the polishing-brushes. Interposed between the draw-disks upon the lower shafts 155 and 156 are sprocket-wheels (not shown) over which sprocket-chains 157 pass. The chains in construction are continuous, passing through the drier 150 in the manner shown, over the shafts described, over sprocket-wheels on a similar shaft 158, having bearings in the platform 137, and beneath chain-tighteners 159, suitably secured to the platform 144. The chain carriers just referred to and the draw-disks receive motion from the shaft 123 through worms arranged upon said side shaft which engage with worm-wheels (not shown) upon the upper shafts of the three pairs of draw-disks. By this construction of conveying mechanism the sheets after leaving the scrubbing-brushes will be carried by means of the draw-disks 152 onto the carrier-chains 157, which in turn carry the plates through the drier between the polishing-brushes, from which they are delivered over the draw-disks 154 upon a car 160, from whence they are removed from the apparatus to be stored or shipped, as desired.

The apparatus having now been described and the several steps of the process set forth, attention is drawn to the value of subjecting the sheets to a water-bath after passing from the coating-tank. To remove the oxid from the coating-rolls, thus keeping the latter bright and clean, a flux of sal-ammoniac is placed in the tank in the salt-box formed by the partition 93. The value of having the rolls in this condition is too well known to require further explanation. During the operation of the apparatus particles of flux adhere to the coating-rolls, and when the metallic sheets pass between and beyond the former some of the sal-ammoniac or whatever is employed as a flux adheres to the plates, producing stains or spots upon the sheets when the latter are finished. To avoid this, I subject the galvanized plates while hot to the action of a water-bath, the result being that the water unites with the hot superfluous sal-ammoniac and the latter is quickly removed. Other foreign matter which may have accumulated upon the plates while undergoing the various steps of the process is removed by the scrubbing devices hereinbefore described.

Although I have mentioned a water-bath as the preferable material to remove the superfluous flux, I do not wish to be limited to this material alone, as other baths performing the same function may be employed. Moreover, while I have shown and described the preferable type of apparatus for vertically and laterally adjusting the coating-rolls and the mechanism for flicking the sheets as they are delivered from the tank, I do not wish to be limited to the exact construction shown, as other forms may be employed without departing from the spirit of my invention.

It will be further observed that while I have introduced in my process the step of reducing the temperature of the sheets before they enter the water-bath this step is not absolutely essential in all cases. It is deemed preferable, however, as by this method of procedure the malleability of the sheets or plates is retained; also, while I have described a process and apparatus for galvanizing metallic sheets, it will be obvious that the apparatus may be employed for tinning plates or for coating metallic sheets with any desirable material.

Having thus described my invention, what I claim, and desire to secure by Letters Patent, is—

1. The herein-described process of galvanizing metallic sheets, which consists, first, in immersing the plates or sheets in a flux-bath, in then dipping the plates in a coating-bath, in again fluxing the plates, in subjecting the latter, while hot, to the action of a bath of material that will soften or dissolve the superfluous flux that is left upon the sheets, and finally, in cleaning the sheets of such material.

2. The herein-described process of galvanizing metallic sheets or plates, which consists in first subjecting the plates to the action of a flux-bath, in then dipping the plates in a coating-bath, in again fluxing the plates, in reducing the temperature of the sheets by subjecting the latter to the action of steam, in immersing the plates, while hot, in a bath of material that will soften or dissolve the superfluous flux that remains upon the plates, and finally, in cleaning the plates or sheets of such material.

3. In a galvanizing apparatus, the combination with the coating-tank, of the coating-rolls, and means for rotatably supporting said rolls within the tank, comprising U-shaped bars having horizontal portions 57, vertical extensions 58, hooks 59, half bearing-blocks arranged upon the horizontal portion, each mounted for lateral movement, and means for adjusting the blocks laterally, substantially as described.

4. In a galvanizing apparatus, the combination with the coating-tank, of the coating-rolls, and means for supporting and adjusting the tension between said rolls, comprising two vertical supporting members hooked over the edges of the tank and depending within the latter, a transverse member connecting the lower ends of the depending members and adapted to receive the roll-journals, an upright, secured to one of the vertical members and extending upwardly from the tank, a second upright loosely mounted upon the other transverse member, and a tension device connecting the upper ends of the uprights, substantially as described.

5. In a galvanizing apparatus, the combination with the coating-tank, of the coating-rolls, means for feeding the coated plate away from the rolls, and a coating-removing device so constructed and arranged with reference to the plate-feeding means as to act upon the lower edge only of the plate and automatically remove the superfluous coating material from the lower portion of each plate upon the delivery of the latter from the coating-rolls.

6. In a galvanizing apparatus, the combination with the coating-tank, of coating-rolls rotatably mounted within the tank, and a coating-removing mechanism, comprising a plate-shaking device, constructed to automatically flick or snap the lower portion of each plate upon its delivery from the coating-rolls, thereby removing the superfluous coating material from said plate.

7. In a galvanizing apparatus, the combination with the coating-tank, of coating-rolls rotatably mounted within the tank, and means for flipping the lower edges of the plates as they are delivered from the coating-rolls, comprising side bars 85, suitably mounted and projecting within the tank, and provided with curved ends, and a guide 84 arranged over the tank, said arms and guide being arranged substantially as and for the purpose described.

8. In a galvanizing apparatus, the combination with the coating-tank, of coating-rolls rotatably mounted within said tank in supports hooked over the sides thereof, and means for securing and laterally adjusting the supports, comprising a slotted bar 77 arranged between the hooks, and bolts 79, substantially as described.

9. In a galvanizing apparatus, the combination with the coating-tank, of coating-rolls rotatably mounted within said tank, a drive-shaft adapted to operate the rolls, and a rotating indicator arranged upon the shaft and constructed to continuously show the height of the coating material within the tank.

10. In a galvanizing apparatus, the combination with the coating-tank, of coating-rolls rotatably mounted within the tank, a drive-shaft adapted to operate the rolls, and an indicating-disk secured to the shaft, substantially as and for the purpose described.

11. In a galvanizing apparatus, the combination with the galvanizing mechanism, of a soaking-tank, a conveyer leading from said galvanizing mechanism into said tank, and a spraying device, adapted to reduce the temperature of the sheets as they pass from the galvanizing mechanism to the tank.

12. In a galvanizing apparatus, the combination with the coating-rolls, of means for removing the drip from the lower edge of the plate consisting of a stop, and means for snapping the edge of the plate against the stop as it leaves the rolls.

13. In a galvanizing apparatus, the combination with the coating-tank, of flux-rolls rotatably mounted within the tank at one end thereof, coating-rolls mounted in like manner at the other end, and a guide for the plates arranged between the rolls, comprising a guide-support hooked over the edge of each side of the tank, transverse rods connecting the guide-supports, and a series of guide-bars arranged in pairs upon the transverse rods, substantially as described.

14. In a galvanizing apparatus, the combination with the coating-tank, of coating-rolls mounted within the tank, and mechanism for removing superfluous coating material from the plates, comprising a conveyer over which the plates pass upon leaving the tank, and a device against which the lower portions of the plates are adapted to strike upon their delivery from the coating-rolls.

In testimony whereof I affix my signature in presence of two witnesses.

THOMAS REES.

Witnesses:
L. J. WHITTEMORE,
CHAS. L. STOCKER.